United States Patent [19]
Yoon

[11] Patent Number: 5,986,538
[45] Date of Patent: Nov. 16, 1999

[54] N-BIT COMPARATOR

[75] Inventor: Seok-Joong Yoon, Suwon, Rep. of Korea

[73] Assignee: Samsung Electronics Co., Ltd., Kyungki-do, Rep. of Korea

[21] Appl. No.: 08/926,510

[22] Filed: Sep. 9, 1997

[30] Foreign Application Priority Data

Nov. 15, 1996 [KR] Rep. of Korea ..................... 96-054477

[51] Int. Cl.[6] ....................................................... G06F 7/50
[52] U.S. Cl. ........................... 340/146.2; 326/52; 326/54; 326/55
[58] Field of Search ........................... 340/146.2; 326/52, 326/54, 55

[56] References Cited

U.S. PATENT DOCUMENTS 4,870,305  9/1989  Rocchj .................................... 307/471
5,334,888  8/1994  Bodas ..................................... 307/471
5,357,235  10/1994  McClure .............................. 340/146.2

*Primary Examiner*—Margaret R. Wambach
*Attorney, Agent, or Firm*—Skjerven, Morrill, MacPherson, Franklin & Friel LLP; David T. Miller

[57] ABSTRACT

An N-bit comparator compares two numbers A and B each consisting of N bits to each other and includes: N one-bit comparing circuits for generating a second output of a first level and a first output of a second level which is complementary to the first level if a bit ai ($0 \leq i \leq N-1$) of the number A is equal to a bit bi ($0 \leq i \leq N-1$) of the number B, for generating the second output of the second level and the first output of the first level if bit ai is greater than bit bi, and for generating the first output of the second level and the second output of the second level if bit ai is less than bit bi; and a final comparing circuit for receiving the first and second outputs of the one-bit comparing circuits and for generating a final comparative result of the two numbers by a comparative result of lower places when upper places of the two numbers are equal to each other.

20 Claims, 2 Drawing Sheets

N-BIT COMPARATOR

BACKGROUND OF THE INVENTION

1. Field of the Invention

The present invention relates to comparators and, more particularly, to a comparator for comparing two numbers with each other at high speed.

2. Detailed Description of Related Art

A digital comparator is a basic circuit constructed to compare two digital signals A and B with each other and determine whether signal A represents a value that is greater than, less than or equal to the value represented by signal B. For N-bit signals A and B, N exclusive OR gates combined with an AND gate can identify whether signal A is equal to signal B. However, if signal A differs from signal B, bits of signal A should be compared to the corresponding bits of signal B in an order from the most significant bit to the least significant bit to judge whether signal A represents a value greater than the value represented by signal B. Accordingly, the time required for the comparative operation increases as the number of bits in signals A and B increases.

SUMMARY OF THE INVENTION

It is an object of the present invention to provide an N-bit comparator which can carry out a comparative operation at high speed with a small number of transistors.

It is another object of the present invention to provide a one-bit comparator which can compare two bits by using the least number of transistors.

According to one feature of the present invention, the N-bit comparator for comparing two numbers A and B, each consisting of N bits, includes: N one-bit comparing circuits connected to a final comparing circuit. Each one-bit comparing circuit generates a first output signal and a second output signal. The second output signal is at a first binary level, and the first output signal is at a second binary level which is complementary to the first level if an input bit ai ($0 \leq i \leq N-1$) from the number A to the one-bit comparing circuit is equal to a corresponding bit bi ($0 \leq i \leq N-1$) from the number B. The second output signal is at the second level, and the first output signal at the first level if bit ai is greater than bit bi. The first output signal is at the second level, and the second output signal is at the second level if bit ai is less than bit bi. The final comparing circuit receives the first and second output signals of the N one-bit comparing circuits and generates a final comparative result for the two numbers A and B by comparing results of less significant bits when the more significant bits of the two numbers are equal to each other.

According to another feature of the present invention, a one-bit comparator for comparing two bits ai and bi with each other includes: a MOS transistor of a first conductivity having a gate connected to bit bi and a source and a drain connected between bit ai and an output terminal; and another MOS transistor of a second conductivity having a gate connected to bit bi and a drain and a source connected between the output terminal and a ground terminal.

BRIEF DESCRIPTION OF THE DRAWINGS

The above and other objects, features and advantages of the present invention will become more apparent from the following detailed description taken with the accompanying drawings in which.

DETAILED DESCRIPTION OF PREFERRED EMBODIMENT

Figure 1:
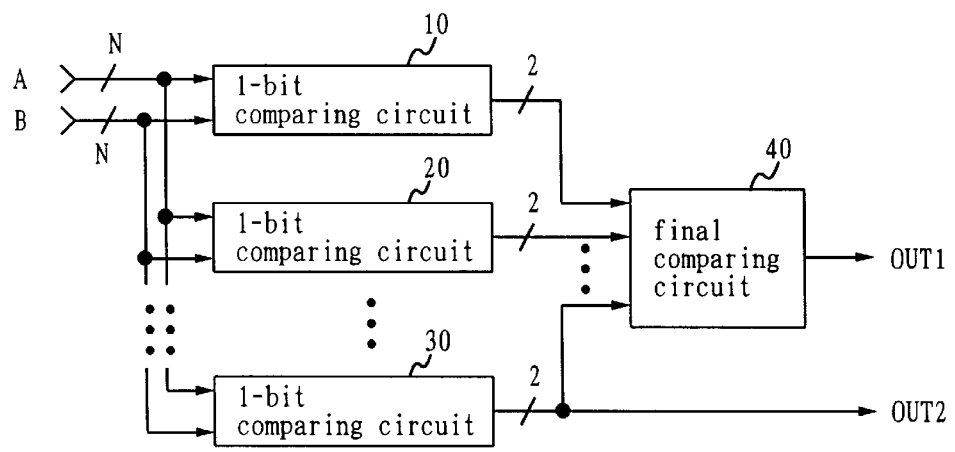
FIG. 1 is a block diagram of an N-bit comparator according to the present invention.

FIG. 1 illustrates an N-bit comparator including N one-bit comparing circuits 10, 20 and 30, and a final comparing circuit 40. Each one-bit comparing circuits 10, 20, and 30 compares a bit from an N-bit number A to a bit from an N-bit number B and generates two output signals having levels indicating the results of the one-bit comparison. If a bit ai ($0 \leq i \leq N-1$) of number A is equal to a corresponding bit bi ($0 \leq i \leq N-1$) of number B, the one-bit comparing circuit associated with bits ai and bi generates a second output signal at a first binary level and a first output signal at a second binary level which is complementary to the first level. If a bit ai is greater than the corresponding bit bi, the one-bit comparing circuit associated with bits ai and bi generates the second output signal at the second level and the first output signal at the first level. If a bit ai is less than the corresponding bit bi, the one-bit comparing circuit associated with bits ai and bi generates the first output signal at the second level and the second output signal at the second level. The final comparing circuit 40 receives the first and second output signals of the one-bit comparing circuits 10, 20 and 30 and generates a final comparative result for the two numbers A and B by comparing the results for the less-significant bits when the more-significant bits of the two numbers are equal to each other.

Figure 2:
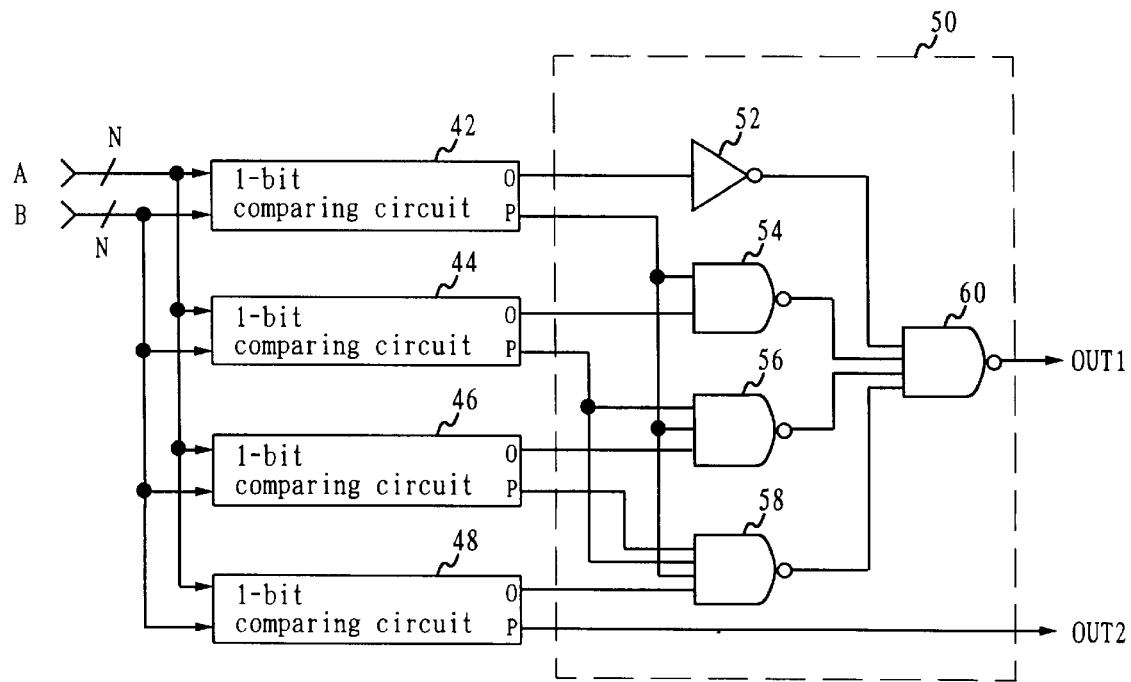
FIG. 2 is a block diagram of a 4-bit comparator according to one preferred embodiment of the present invention.

FIG. 2 illustrates a 4-bit comparator that includes four 1-bit comparing circuits 42, 44, 46, and 48 and a final comparing circuit 50. One-bit comparing circuits 42, 44, 46, and 48 respectively compare bit pairs (a3, b3), (a2, b2), (a1, b1) and (a0, b0) from numbers A and B, and each one-bit comparing circuit generates a first output signal O and a second output signal P having levels indicating the result of a comparison. Final comparing circuit 50 includes: an inverter 52 for inverting first output signal O of one-bit comparing circuit 42, which compares the most significant bits a3 and b3 of numbers A and B; three NAND gates 54, 56 and 58 and a NAND gate 60 having the output signal of inverter 52 and the output signals of NAND gates 54, 56 and 58 as input signals. As shown in FIG. 2, each of NAND gates 54, 56, and 58 has input signals consisting of a first output signal O from a respective one of one-bit comparing circuits 44, 46, and 48 and the second output signals P of the one-bit comparing circuits that are associated with bits more significant than the bit of the one-bit comparing circuit supplying the first output signal O. For example, NAND gate 56 has as input signals first output signal O from one-bit comparing circuit 46 and second output signals P from one-bit comparing circuits 42 and 44. NAND gate 60 generates a final result of the comparison of the two numbers A and B.

Figure 3:
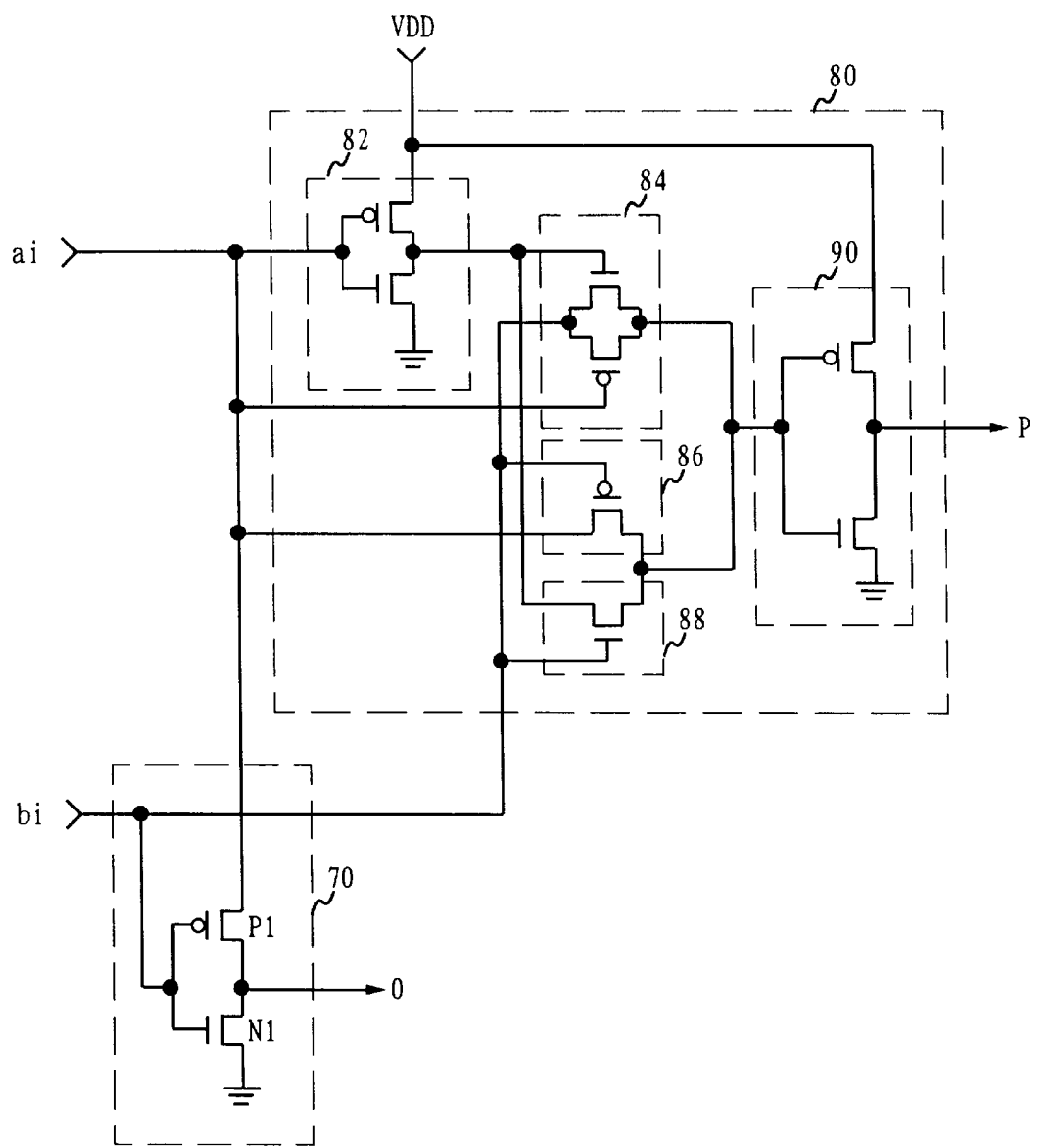
FIG. 3 is a circuit diagram of each one-bit comparing circuit shown in FIG. 2.

FIG. 3 illustrates circuitry within each one-bit comparing circuits 42, 44, 46, and 48 shown in FIG. 2. Each of the one-bit comparing circuits 42–48 has a size comparing circuit 70 and an equality comparing circuit 80. Size comparing circuit 70 generates the first output signal O which is at the first level when input bit ai is greater than input bit bi (i.e., when bit ai is high and bit bi is low) and at the second level when bit ai is less than or equal to bit bi. Equality comparing circuit 80 generates the second output signal P which is at the first level when bit ai is equal to bit bi and at the second level when bit ai differs from bi.

Size comparing circuit 70 includes a MOS transistor P1 of a first conductivity (e.g., p-channel) having a gate connected to bit bi and having a source and a drain connected between bit ai and an output terminal for first output signal O, and another MOS transistor N1 of a second conductivity (e.g., n-channel) having a gate connected to bit bi and a drain and a source connected between the output terminal for first output signal O and a ground terminal.

Equality comparing circuit 80 includes a first CMOS inverter 82 for inverting bit ai, a first transfer gate 84 for transferring bit bi in response to the output signal of first CMOS inverter 82 being high and bit ai being low, a second transfer gate 86 for transferring bit ai in response to bit bi being low, a third transfer gate 88 for transferring the output of first CMOS inverter 82 in response to bit bi being high, and a second CMOS inverter 90 for receiving and inverting the combined output signals of the first, second and third transfer gates 84, 86, and 88 to generate second output signal P.

Assuming that number A is a3a2a1a0 and number B is b3b2b1b0, the output signals O and P of each one-bit comparing circuit of FIG. 3 have levels as indicated in the following Table 1.

TABLE 1

| ai | bi | second output (P) | first output (O) |
|----|----|-------------------|------------------|
| 0  | 0  | 1                 | 0                |
| 0  | 1  | 0                 | 0                |
| 1  | 0  | 0                 | 1                |
| 1  | 1  | 1                 | 0                |

If the most significant bit a3 of number A is greater than the most significant bit b3 of number B, first output signal O of one-bit comparing circuit 42 is at a high level, and the output signal of inverter 52 is at a low level. Then, NAND gate 60 generates signal OUT1 at a high level irrespective of its other input signals. The output signal OUT1 being at the high level indicates that number A is greater than number B.

If bit b3 is greater than bit a3, first and second output signals O and P of one-bit comparing circuit 42 are at a low level. The output signal of inverter 52 and the output signals of the NAND gates 54, 56 and 58 are all at a high level, and output signal OUT1 from NAND gate 60 is at a low level, indicating value A is less than value B.

If bit a3 is equal to bit b3, first output signal O of one-bit comparing circuit 42 is at a low level, and second output signal P of one-bit comparing circuit 42 is at a high level. The output signal of the NAND gate 54 is determined by the first output signal O of one-bit comparing circuit 44, which is associated with the next most significant bits a2 and b2 of numbers A and B. If bit a2 is greater than bit b2, first output signal O of one-bit comparing circuit 44 is at a high level. The output signal of NAND gate 54 is at a low level, and output signal OUT1 of NAND gate 60 is high irrespective of other input signals to NAND gate 60. If bit a2 is less than bit b2, output signals O and P of one-bit comparing circuit 44 are low. Signal O from one-bit circuit 44 being low forces the output signal from NAND gate 54 high. Signal P from one-bit circuit 44 being low forces the output signals from NAND gates 56 and 58 high. Accordingly, output signal OUT1 of NAND gate 60 is low. If bit a2 is equal to bit b2, signal O from one-bit comparing circuit 44 is low, causing the output signal from NAND gate 54 to be high, and signal P from one-bit comparing circuit is high so that the output signals from NAND gates 56 and 58 depend on comparisons performed by one bit comparing circuits 46 and 48. If the two most significant bits a3 and a2 of number A are the same as the two most significant bits b3 and b2 of number B, the output signal of NAND gate 56 is low and signal OUT1 is high if bit a1 is greater than bit b1. If the three most significant bits of number A are the same as the three most significant bits of number B, the output signal of NAND gate 58 is low and signal OUT1 is high if bit A0 is greater than bit B0. Signal OUTI is low if bits A3 . . . A1 are equal to bits B3 . . . B1 and bit A0 is less than or equal to bit B0. Accordingly, a signal OUT2, which is equal to the second output signal P of one-bit comparing circuit 48, is required to distinguish the case where value A is equal to value B and the case where value A is one less than value B. The size of value A relative to value B is judged by the first output signal OUT1 and the second output signal OUT2 of the comparator as shown in Table 2.

TABLE 2

|       | OUT1 | OUT2 |
|-------|------|------|
| A > B | 1    | 0    |
| A < B | 0    | 0    |
| A = B | 0    | 1    |

As shown in FIG. 3, size comparing circuit 70 contains two transistors, and equality comparing circuit 80 contains eight transistors. Thus, the one-bit comparing circuit is simply constructed using ten transistors, making the one-bit comparing circuits relatively small. Accordingly, area on chip is minimized, and a propagation delay time of a signal can be reduced. The inventive comparator can process a comparative operation at high speed and is very useful for comparing two numbers having a large number of bits.

While the present invention has been particularly shown and described with reference to the particular embodiments thereof, it will be understood that various changes in form and details may be effected therein without departing from the spirit and scope of the invention as defined by the appended claims.

What is claimed is:

1. An N-bit comparator for comparing two numbers A and B, each consisting of N bits, with each other, comprising:

N one-bit comparing means for generating a second output of a first level and a first output of a second level which is complementary to the first level if a bit ai ($0 \leq i \leq N-1$) of each place of said number A is equal to a bit bi ($0 \leq iN-1$) of each place of said number B, for generating the second output of the second level and the first output of the first level if said bit ai is greater than said bit bi, and for generating the first output of the second level and the second output of the second level if said bit ai is less than said bit bi; and final comparing means for receiving the first and second outputs of said one-bit comparing means and for generating a final comparative result of said two numbers by a comparative result of lower places when upper places of said two numbers are equal to each other.

2. An N-bit comparator as claimed in claim 1, wherein said final comparing means comprises:

an inverter for inverting a first output of the one-bit comparing means of the most significant place;

(N-1) NAND gates for generating first outputs of each one-bit comparing means of the other places in response to second outputs of the one-bit comparing means of upper places; and a NAND gate for receiving the output of said inverter and the outputs of said (N−1) NAND gates and generating a final comparative result of said two signals.

3. An N-bit comparator as claimed in claim 1, wherein each of said N one-bit comparing means comprises:

size comparing means for generating said first output of the first level if said bit ai is greater than said bit bi and for generating said first output of the second level if said bit ai is smaller than or equal to said bit bi; and equality comparing means for generating said second output of the first level if said bit ai is equal to said bit bi and for generating said second output of the second level if said bit ai differs from said bit bi.

4. An N-bit comparator as claimed in claim 3, wherein said size comparing means comprises:

an MOS transistor of a first conductivity having a gate connected to said bit bi and having a source and a drain connected between said bit ai and said first output; and another MOS transistor of a second conductivity having a gate connected to said bit bi and having a drain and a source connected between said first output and a ground terminal.

5. An N-bit comparator as claimed in claim 3, wherein said equality comparing means comprises:

a first CMOS inverter for inverting said bit ai;

a first transfer gate for transferring said bit bi in response to the output of said first CMOS inverter and said bit ai;

a second transfer gate for transferring said bit ai in response to said bit bi;

a third transfer gate for transferring the output of said first CMOS inverter in response to said bit bi; and a second CMOS inverter for commonly receiving the outputs of said first, second and third transfer gates and generating the inverted signal of an input signal as said second output.

6. A one-bit comparator for comparing two bits ai and bi with each other, comprising:

a size comparing means that generates a first output of the first level if the bit ai is greater than the bit bi, and generates the first output of the second level if the bit ai is smaller than or equal to the bit bi, wherein the size comparing means comprises:

a first MOS transistor of a first conductivity having the gate connected to the bit bi and having a source and a drain connected between the bit ai and a first output terminal:

a second MOS transistor of a second conductivity having a gate connected to the bit bi and having a drain and a source connected between the first output terminal and a around terminal;

an equality comparing circuit that generates a second signal indicating whether the bit ai is equal to the bit bi, wherein the equality comparing circuit comprises:

a first transfer gate coupled between the bit ai and a second output terminal, the first transfer gate having a gate coupled so that the first transfer gate conducts or not in response to the bit bi;

an inverter coupled to the bit ai; and a second transfer gate coupled between an output terminal of the inverter and the second output terminal, the second transfer gate having a gate coupled so that the second transfer gate conducts when the first transfer gate does not conduct.

7. The comparator of claim 6, further comprising a third transfer gate coupled between the bit bi and the second output terminal, the third transfer gate having a gate coupled so that the third transfer gate conducts or not in response to the bit ai.

8. The comparator of claim 7, further comprising a second inverter coupled between the second output terminal and the first, second, and third transfer gates.

9. The comparator of claim 6, wherein the first transfer gate comprises a first transistor of a first conductivity and the second transfer gate comprises a second transistor of a second conductivity that is opposite the first conductivity.

10. A comparator comprising:

one-bit comparing circuits that are in one-to-one correspondence with N bits in a first value and with N bits in a second value, each one-bit comparing circuit generating a first output signal and a second output signal, wherein the first output signal is a binary signal indicating whether a first bit that is from the first value and corresponds to the one-bit comparing circuit is greater than a second bit that is from the second value and corresponds to the one-bit comparing circuit, and the second output signal is a binary signal indicating whether the first bit is equal to the second bit; and a final comparing circuit coupled to receive the first output signals and the second output signals from the one-bit comparing circuits, wherein the final comparing circuit generates a signal indicating whether the first value is greater than, less than, or equal to the second value.

11. The comparator of claim 10, wherein the final comparing circuit comprises:

a series of gates, each gate in the series being coupled to receive the first output signal from one of the one-bit comparing circuits that corresponds to the gate and coupled to receive the second output signal from each one-bit comparing circuit that corresponds to a bit of the first value that is more significant than a bit of the first value that corresponds to the one-bit comparing circuit that provides the first output signal to the gate; and combination logic coupled to receive output signals from each gate in the series.

12. The comparator of claim 11, wherein each gate in the series is a NAND gate.

13. The comparator of claim 12, further comprising an inverter coupled to received the first output signal from the one-bit comparing circuit that corresponds to the most significant bit of the first value.

14. The comparator of claim 13, wherein the combination logic comprises a NAND gate having input terminals coupled to the output terminals of the inverter and the NAND gates in the series.

15. A one-bit comparator for comparing two bits ai and bi with each other, comprising:

a size comparator that generates a first signal indicating whether the bit ai is greater than the bit bi or the bit ai is less than or equal to the bit bi, wherein the size comparator comprises:

a first MOS transistor of a first conductivity having a gate connected to the bit bi and having a source and a drain connected between the bit ai and a first output terminal;

a second MOS transistor of a second conductivity having a gate connected to the bit bi and having a drain and a source connected between the first output terminal and a ground terminal;

an equality comparator that generates a second signal indicating whether the bit ai is equal to the bit bi or the bit ai differs from the bit bi.

16. The comparator of claim 15, wherein the drain of the second MOS transistor is directly connected to the first output terminal.

17. The comparator of claim 15, wherein the equality comparator comprises:
- a first transfer gate coupled between the bit ai and a second output terminal, the first transfer gate having a gate coupled so that the first transfer gate conducts or not in response to the bit bi;
- an inverter coupled to the bit ai; and
- a second transfer gate coupled between an output terminal of the inverter and the second output terminal, the second transfer gate having a gate coupled so that the second transfer gate conducts when the first transfer gate does not conduct.

18. The comparator of claim 17, further comprising a third transfer gate coupled between the bit bi and the second output terminal, the third transfer gate having a gate coupled so that the third transfer gate conducts or not in response to the bit ai.

19. The comparator of claim 18, further comprising a second inverter coupled between the second output terminal and the first, second, and third transfer gates.

20. The comparator of claim 19, wherein the first transfer gate comprises a first transistor of a first conductivity and the second transfer gate comprises a second transistor of a second conductivity that is opposite the first conductivity.

* * * * *